United States Patent [19]

Whitehead

[11] Patent Number: 4,951,199

[45] Date of Patent: Aug. 21, 1990

[54] STEERING STABILIZING METHOD AND APPARATUS FOR SUPPRESSING THE WEAVE MODE

[76] Inventor: John C. Whitehead, 3322 Biscayne Bay Pl., Davis, Calif. 95616

[21] Appl. No.: 120,648

[22] Filed: Nov. 16, 1987

[51] Int. Cl.$^5$ ............................................. G05D 17/02
[52] U.S. Cl. ................................ 364/424.05; 180/142
[58] Field of Search ............... 364/424, 424.01, 424.05; 180/142, 6.2, 6.24, 6.3, 6.44, 6.48, 242; 74/388 PS

[56] References Cited

U.S. PATENT DOCUMENTS

| | | | |
|---|---|---|---|
| 2,101,057 | 12/1937 | Fuller | 180/215 |
| 2,957,535 | 10/1960 | Helgeson | 180/143 |
| 3,011,579 | 12/1961 | Milliken, Jr. et al. | 180/142 |
| 3,744,587 | 7/1973 | Schimkat et al. | 180/142 |
| 3,866,706 | 2/1975 | Lincke et al. | 180/142 |
| 3,897,846 | 8/1975 | Inoue | 180/142 |
| 3,944,014 | 3/1976 | Maisch et al. | 180/142 X |
| 4,593,358 | 6/1986 | Takeshima et al. | 364/424.05 |
| 4,621,701 | 11/1986 | Takabayashi et al. | 180/79.1 |
| 4,640,380 | 2/1987 | Daido et al. | 180/141 |
| 4,650,019 | 3/1987 | Yanai et al. | 180/79.1 |
| 4,664,211 | 5/1987 | Oshita et al. | 180/142 |
| 4,666,013 | 5/1987 | Shibahata et al. | 180/141 |
| 4,676,334 | 6/1987 | Nakamura et al. | 180/142 |
| 4,688,655 | 8/1987 | Shimizu | 180/79.1 |
| 4,690,431 | 9/1987 | Ito et al. | 180/142 X |
| 4,773,012 | 9/1988 | Ito et al. | 364/424.01 |
| 4,830,127 | 5/1989 | Ito et al. | 364/424.01 X |
| 4,834,204 | 5/1989 | Ito et al. | 364/424.1 X |

FOREIGN PATENT DOCUMENTS

| | | | |
|---|---|---|---|
| 24670 | 2/1986 | Japan | 180/142 |
| 4674 | 1/1987 | Japan | 180/142 |

OTHER PUBLICATIONS

Segel, L., On the Lateral Stability and Control of the Automobile as Influenced by the Dynamics of the Steering System, ASME J. Eng. for Industry, 1966.
Whitehead, J. C., Rear Steering of Road Vehicles: An Analysis of Yaw Stability, University of California at Davis, Thesis for M.S., 1983.

Primary Examiner—Eugene R. LaRoche
Assistant Examiner—Benny T. Lee

[57] ABSTRACT

A steering system for a vehicle has a torque actuator under automatic control which applies transient steering torque during rapid maneuvers in addition to any power-assist torque. The transient active torque acts without delay in response to steer angle changes, thereby opposing steering overshoot and stabilizing emergency lateral maneuvers at high speed. A means for estimating natural restoring torque expected during steady-state cornering receives signals indicating vehicle speed and the steer angle. A further measurement means produces a signal proportional to instantaneous natural steering torque, which is a lateral acceleration signal in the preferred embodiments. The difference between the signal proportional to instantaneous torque and a signal proportional to expected steady-state torque is large during and immediately after rapid steering motions, because vehicles have a delay between any change in steer angle and the resulting change in natural restoring steering torque. The transient active torque supplements or opposes the natural torque according to said difference, to effectively reduce said delay. The result is that the sum of natural and active steering torques acts to restore the steered wheels to the straight-ahead position, with reduced overshoot. An additional means for damping high frequency steering system oscillations is included. The main benefit of the invention is to stabilize the free control oscillation at approximately 1 Hz which is a whole vehicle mode rather than a steering system oscillation. This free control weave mode can result in steering overshoot when the driver of a vehicle without the invention performs a rapid emergency maneuver. The stabilizing apparatus thus has a different purpose from conventional power assisted steering systems which amplify steering torque applied by the driver of a vehicle. The stabilizing apparatus can operate on front wheel steering or rear wheel steering vehicles, with or without power steering.

14 Claims, 4 Drawing Sheets

← Direction of Vehicle Motion

STEERING STABILIZING METHOD AND APPARATUS FOR SUPPRESSING THE WEAVE MODE

BACKGROUND

1. Field of Invention

The invention relates to vehicle steering systems, with particular regard to improvement of high-speed stability by dynamic transient torques from an electric or hydraulic actuator. This function of a steering apparatus is different from, and can act in addition to, the usual power steering function of assisting the driver's steering action. The invention helps the driver to maintain control of the vehicle during severe emergency maneuvers, with front-wheel-steering (FWS) but also with rear-wheel-steering (RWS) which is otherwise unstable at high speeds.

2. Discussion of Prior Art

Power steering systems generally function by amplifying the torque exerted on the steering wheel by the driver, so that the steering wheel torque required of the driver is less than the actual torque needed to steer the wheels, with the extra torque being provided by a hydraulic or electric actuator. A recent example of a power steering system which functions as a torque amplifier is U.S. Pat. No. 4,621,701. It has been recognized that the amplification gain of power steering should decrease as vehicle forward speed increases because a driver can more easily lose control at high speeds if rapid steering motions are effortless. In accordance with this level of understanding, speed-dependent power steering has been implemented. For example, U.S. Pat. No. 4,640,380 describes an apparatus which applies opposing torque to the steering wheel in a fashion that increases with vehicle speed.

The prior art for the design of steering systems has not recognized that automobiles have a natural mode of steering oscillation at a frequency of approximately 1 Hz, a phenomenon which becomes more pronounced at high speeds. This weave mode consists of a lateral oscillatory motion of the entire vehicle as it moves along the highway, but it is usually not noticed because of steering system friction and the fact that driver steering frequencies are almost always below 0.5 Hz. Although the weave mode has been documented in the scientific literature (Segel 1965), its cause and importance have not been understood.

Drivers must steer rapidly for emergency avoidance lane change maneuvers which require steering frequencies up to and above 1 Hz, and steering torques much greater than steering system friction. The weave mode resonance at about 1 Hz therefore becomes excited, which compromises the driver's control authority over the vehicle. It is well known that loss of control in such situations is characterized by overshoot of steering corrections and lateral oscillation of the vehicle position on the roadway. The cause of the weave mode can be understood by considering the source of natural steering torque in the response of vehicles.

When a vehicle with a conventional steering system is in a steady turn, there is a restoring steering torque due to the lateral tire force applied by the road toward the center of the turning circle. The caster offset or trail of the steering geometry provides a lever arm for action of this force about the kingpin axis, so a torque is produced which tends to return the steered wheels to the straight-ahead position. However, there is a delay in the change of restoring steering torque after a change in steer angle. This delay occurs either in the presence or absence of a power steering apparatus because it is directly related to a vehicle's lateral acceleration response time.

After performing a rapid emergency lane change, a driver must quickly reverse the steering direction in order to direct the path of the vehicle straight along the new lane. At high speeds, the natural restoring steering torque persists after the steer angle reversal occurs, causing overshoot in the new steering direction. After the characteristic delay time, the natural restoring torque then reverses direction also, but not until after significant overshoot has occurred. The resulting oscillation is the weave mode, and the driver is in danger of losing control of the vehicle.

Prior art vehicle steering systems have sources of steering torque in addition to tire forces, including power-assist and steering dampers. Conventional power steering systems cannot prevent excitation of the weave mode by the driver, because the magnitude of power-assist torque is not sensitive to the dynamic state of the vehicle which causes the delay in natural steering torque. Essentially, the torque applied by a power steering actuator does not have the transient character which is needed to compensate for the weave mode resonance. Conventional steering dampers eliminate steering system vibrations because they apply opposing effort depending on steering angular rate. However, the weave mode is a whole vehicle mode fundamentally different from any steering system vibration. Dampers are not sensitive to the dynamic state of the vehicle so only excessive levels of damping begin to affect the weave mode.

In the case of rear-wheel-steering (RWS) vehicles, there is not merely a delay in buildup of steady-state restoring torque, there is a transient torque component which drives the steering mechanism in the direction the steering wheel is turned, resulting in an unstable weave mode rather than a lightly damped stable weave mode. The prior art includes details for the construction of RWS motor vehicles without means for high speed stabilization (U.S. Pat. No. 2,101,057). No practical high-speed RWS motor vehicles have heretofore existed because passive stabilization means cannot compensate for changes in vehicle speed. For example, the prior art by Whitehead (1983) indicates that passive stabilization can be achieved by extreme levels of steering damping, which is impractical because the excessive damping required at high speed impedes driver steering motions.

OBJECTS AND ADVANTAGES

The present invention has been made to solve the above problems both for vehicles equipped with power steering and those without it, since lightweight vehicles which do not normally require power-assisted steering can also benefit from a system which stabilizes the weave mode. Furthermore, the apparatus described herein will stabilize rear-wheel-steering vehicles, which are normally quite dangerous to operate at high speeds. It is therefore evident that the present invention is an entirely new concept different from power-assisted steering systems whose main function is to reduce driver steering workload.

The present invention is a means to apply transient actively controlled torques, which act on the vehicle steering system without delay upon turning of the steering wheel and fade as the natural restoring steering torque settles to its steady-state value. When the phase delay between a change in steer angle and the change in steering torque is reduced in this way, the weave mode is greatly stabilized and the vehicle is much less likely to oscillate out of control after a severe emergency maneuver.

The steady-state natural restoring steering torque depends upon a number of fixed quantities, but also on two variable quantities, the steering wheel angle and the vehicle forward speed. The invention includes a means for producing a signal proportional to the expected steady-state torque in any driving situation, based upon fixed quantities known at the time a vehicle is manufactured, and the two variable quantities which are continuously measured. Further, the invention includes a means for continuously producing a signal proportional to the actual level of natural steering torque present. The difference between this natural torque and the expected steady-state natural torque is used to command the application of transient torque to the steering system.

In the case of lightweight vehicles, the mechanism which accomplishes the above can operate in the absence of a conventional power steering system. Therefore only transient operation of the torque actuator occurs, which requires relatively small amounts of energy. In the case of vehicles which normally require power-assisted steering, the transient torques of the present invention can be applied by the power-steering actuator in addition to conventional power-assist. The conventional part may have any particular characteristics which are due to prior art, such as vehicle speed dependence.

DRAWING FIGURES

Figure 1:
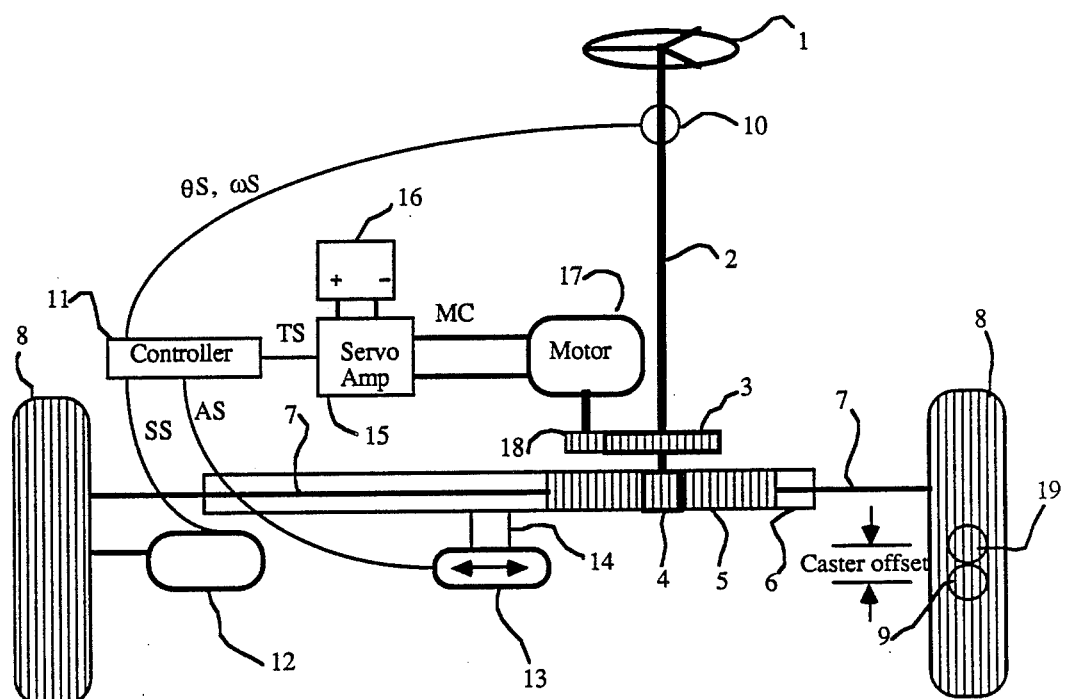
FIG. 1 shows one preferred embodiment of a steering stabilizing apparatus according to the present invention, for the case of lightweight FWS vehicles which do not normally require power steering. The view is from above.

DRAWING REFERENCE NUMERALS 1. driver's steering wheel.
2. steering wheel shaft.
3. torque receiving gear on 2.
4. pinion on 2.
5. rack driven by 4.
6. housing for 5.
7. tie rod
8. steered wheel
9. vertical projection of kingpin axis of 8
10. steer angle and angular rate sensor
11. controller
12. vehicle speed sensor
13. lateral acceleration transducer
14. resilient mount for 13.
15. servo amplifier
16. vehicle battery
17. dc motor
18. gear on 17
19. vertical projection of tire-road contact patch
20. power assist controller with output signal for power steering torque
21. means for adding torque signals
22. chain for rear-wheel-steering linkage
23. sprocket driven by 22
24. steering fork
25. shaft of steering fork
26. bearing tube for 25
27. torque receiving gear on 25
111. means for squaring vehicle speed signal
112. means for multiplying steer angle signal and 111 result
113. gain multiplying means
114. means for substracting expected lateral acceleration from measured lateral acceleration
115. gain multiplying means
116. means for substracting a signal proportional to steer angle rate, from 115 result
117. Gain multiplying means

FRONT-WHEEL-STEERING VEHICLE WITHOUT POWER ASSIST

DESCRIPTION

One preferred embodiment of the invention, as applied to a FWS vehicle without power-assisted steering, will be described below with reference to FIGS. 1 and 2. In FIG. 1, the driver's steering wheel 1 is fixed by a shaft 2 to a torque-receiving gear 3 and a pinion gear 4 which meshes with a rack 5. The rack 5 which is confined within a housing 6, is attached at its ends to tie rods 7 which are attached at pivot points to steered wheels 8. Each steered wheel 8 is free to rotate about its kingpin axis 9. This steering linkage may alternatively be composed of any needed combination of shafts, universal joints, levers, gears, tie rods, and other parts, so that a mechanism is provided which determines the steer angle of the steered wheels 8 according to the angle of the driver's steering wheel 1, without excessive backlash in the linkage. A steer angle and angular rate sensor 10 on the steering shaft 2 has output signal wires which are connected to a controller 11. The sensor 10 is for example, a pulse-producing rotary encoder so that the steer angle signal $\theta S$ and the steering angular rate signal $\omega S$ are transmitted as a pulsed signal with frequency proportional to the angular velocity of the steering shaft 2, in which case the controller 11 includes pulse counting circuitry (not shown) which outputs the two desired signals.

A vehicle speed sensor 12 is driven by the rotation of a wheel 8 or alternatively by an output shaft on the transmission of the vehicle. The controller 11 receives signal SS from the speed sensor 12 which is, for example, a pulse-producing rotary encoder with pulse counting circuitry to produce a signal SS proportional to vehicle speed. A lateral acceleration transducer 13 is fixed to the vehicle in a low position so it is insensitive to roll motions. The transducer 13 has close proximity in the vehicle's longitudinal direction to the axle line of the steered wheels 8, so it indicates an instantaneous lateral acceleration proportional to the total lateral tire force, and hence the natural steering torque, on the steered wheels. This measurement is preferred to the lateral acceleration of the vehicle center of gravity which is affected significantly by the lateral force on the rear tires as well. The optimum placement is such that the longitudinal distance from the transducer to the vehicle center of gravity (c.g.) equals the vehicle's yaw moment of inertia divided by its mass, further divided by the longitudinal distance from the c.g. to the rear axle. In practice, the invention will work with the acceleration transducer 13 placed over a range of positions, but it is preferred that it be placed as described above for maximum effectiveness. In order to reduce signal noise from vibration, the lateral acceleration transducer 13 is fixed to the vehicle using a resilient mount 14 and the signal is passed through a low-pass filter (not shown). The acceleration signal AS is linearly responsive to both steady lateral acceleration and transient lateral acceleration up to a frequency of approximately 10 Hz.

The controller 11 accepts input signals $\theta S$ and $\omega S$, SS, and AS from sensors 10, 12, and 13 respectively, and sends an output torque signal TS to a servo amplifier 15 which is connected by wires of sufficiently high current capacity to the vehicle's battery 16. The servo amplifier 15 is for example a high frequency pulse width modulating circuit and it produces a positive or negative motor current MC, proportional to TS. A dc motor 17 which receives the motor current MC from the servo amplifier 15 through high-current-carrying wires is geared to the steering shaft 2 through gears 18 and 3.

Figure 2:
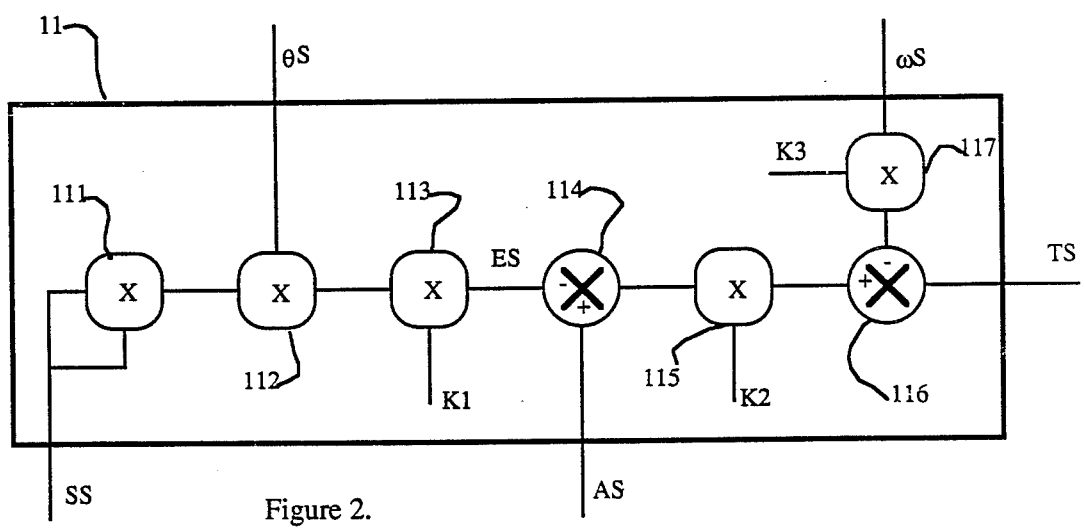
FIG. 2 shows a schematic block diagram of the controller shown in FIG. 1.

The controller 11 described below in block form with reference to FIG. 2, is for example a microcomputer comprising input and output interfaces, a central processing unit and memory units. In FIG. 2, square blocks with round corners containing an "X" represent multiplication and are referred to below as multipliers, although it is to be understood that the blocks are not necessarily discrete hardware units. In order for the system to respond on a time scale which is effectively instantaneous compared to the time scale of the vehicle response and its weave mode, it is sufficient for the arithmetic operations of the controller to be executed approximately 100 times per second. The vehicle speed signal SS is squared at multiplier 111 and the result is multiplied by the steer angle signal $\theta S$ at multiplier 112. For vehicles with strong understeer characteristics, the multiplier 111 is eliminated and the speed signal SS is multiplied directly by the signal $\theta S$ at 112. The output of multiplier 112 is multiplied by a preset gain K1 at multiplier 113 to produce the signal ES, an estimate of the expected steady-state lateral acceleration of the vehicle. The signal ES is substracted from the continuously measured lateral acceleration signal AS at 114, the output of which is connected to a multiplier 115 which multiplies the signal by a preset gain K2. A signal proportional to steering angular rate $\omega S$ is substracted at 116 from the output of 115, with the proportionality constant equal to the preset gain K3 which is multiplied by $\omega S$ at multiplier 117. The resulting torque signal TS represents the active torque to be applied to the steering system.

FRONT-WHEEL-STEERING VEHICLE WITHOUT POWER ASSIST

Operation

Operation of the invention for the case of a vehicle without power-assisted steering is described below with reference to FIGS. 1-3b. If the vehicle is driven straight along a highway with the steered wheels pointed straight ahead, the steering signals $\theta S$ and $\omega S$, and the lateral acceleration signal AS will all be equal to zero. In FIG. 2, the expected lateral acceleration signal ES will be computed as zero. The subtraction operations at 114 and 116 will therefore output zero so TS will be zero resulting in zero motor current MC. If the vehicle is driven on a constant radius curve with a constant steer angle, the signal $\omega S$ will be zero, but $\theta S$ and AS, as well as SS, will be nonzero.

The steady-state lateral acceleration is approximately proportional to the square of vehicle speed times the steer angle, so the signal ES from the multiplier 113 will roughly equal the lateral acceleration signal AS. The lateral acceleration of strongly understeering vehicles varies more or less linearly with vehicle speed, so the elimination of the speed squaring multiplier 111 in this case preserves the approximate equality of ES and AS during steady-state cornering. Therefore the results of subtraction at 114 and 116 and hence the motor current MC, will all be negligibly small during negotiation of constant radius curves.

Figure 3A:
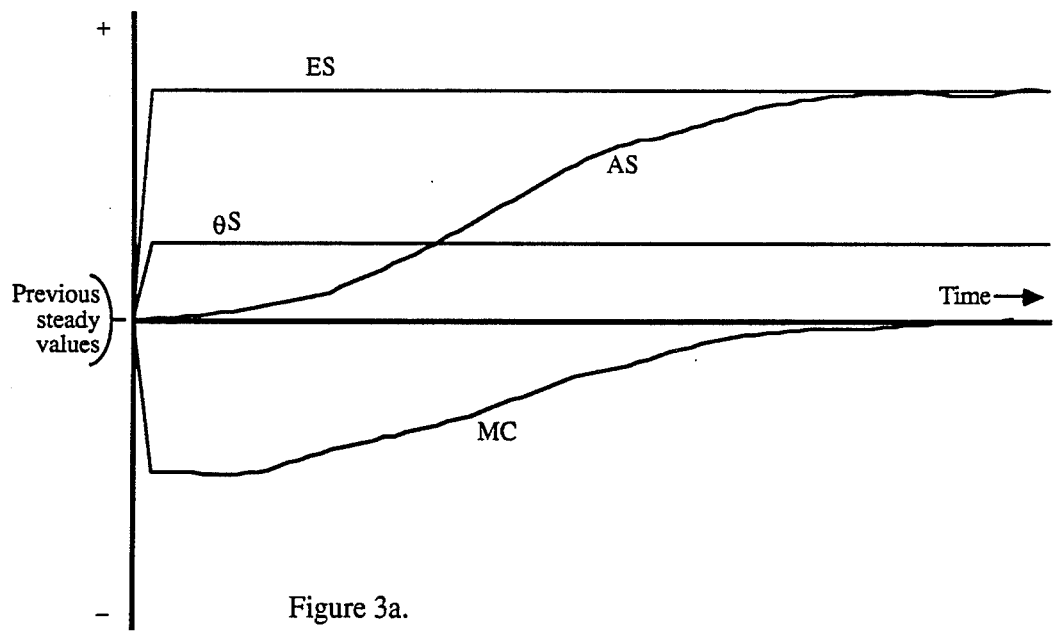
FIGS. 3a and 3b show various graphs of transient response used for explaining the operation of the invention in the embodiment of FIG. 1.

If, however, the steering wheel 1 is rapidly rotated from either of the above two conditions to a new angle, there is a transient period during which the vehicle lateral acceleration changes to its new steady-state value. As shown in FIG. 3a, the value of the signal $\theta S$ changes with minimal delay as the steering wheel 1 is rotated. Therefore, the value of ES equals the steady-state lateral acceleration which is expected, but not yet indicated by the instantaneous lateral acceleration signal AS. The subtraction at 114 thus produces an output signal opposite in sign to the direction of the steering wheel angle change. Subtraction at 116 does not change this result because the steering angular rate signal $\omega S$ is zero with the steering wheel 1 held fixed at its new angle. The signal TS and hence the motor current MC, is also opposite in sign to the steering wheel angle change, so a torque from the motor 17 is exerted on the steering shaft 2 through gears 18 and 3. This torque which is applied to the steering apparatus acts to oppose the steer angle change of the steering wheel 1 and the steered wheels 8. If the steering wheel angle is held constant at its new value, the lateral acceleration signal AS settles to match the estimated steady-state lateral acceleration signal ES, and the motor current MC settles to a negligible level, as shown in FIG. 3a.

Figure 3B:
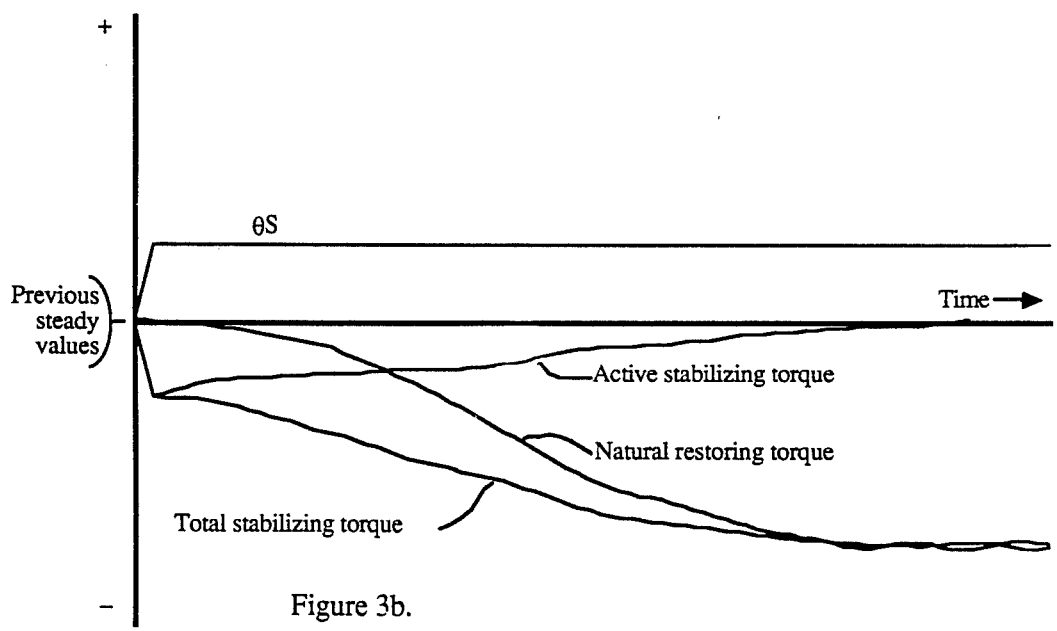

The steering torques described below and shown in FIG. 3b are all evaluated with reference to a common part of the steering system. For example, the steering shaft 2 is a convenient reference axis for all torques. The active torque from the motor 17 must then be multiplied by the ratio of gear 3 to gear 18, and the natural torque due to lateral tire forces acting about the kingpin axes 9 must be similarly adjusted for the leverage of the tie rods 7, the rack 5, and the pinion 4.

The acceleration signal AS from the transducer 13 is approximately proportional to natural restoring steering torque contributed by the net lateral forces exerted by the road surface on the wheels 8 at the tire-road contact points 19. Similarly, the lateral acceleration estimate ES is proportional to the expected steady-state restoring steering torque applied by the road-tire force during a steady turn. Therefore, the difference obtained at 114 is proportional to the difference between actual steering system torque contributed by tire forces and the final value of that torque when the vehicle settles into a new steady-state turning condition. During the transient period, therefore, the motor 17 applies supplemental torque to the steering system, replacing some of the missing natural restoring torque, as shown by the curves in FIG. 3b.

The supplemental torque due to the invention acts upon the entire vehicle steering system, including the steered wheels 8, and the driver's steering wheel 1. Both actions are required for full and correct operation of the invention. For example, if the driver lets go of the steering wheel 1 during a violent maneuver, the vehicle itself will be stabilized since the torque exerted on the steering shaft 2 by the motor 17 must be reacted through the pinion 4 and hence a stabilizing steering torque is applied to the steered wheels 8 through the tie rods 7. If, on the other hand, the driver makes steering motions to excite the weave mode, the stabilizing torque from the motor 17 is partially reacted by the driver's hands, so the extent to which the driver can excite the weave mode is reduced.

The gain K1 is to be set so that when the vehicle is negotiating a typical highway curve at a high speed with the steering wheel 1 held in a constant position, the value of the estimated lateral acceleration signal ES will equal the value of the actual lateral acceleration signal AS, causing the motor current MC and the active torque to be zero. The numerical value of K1 depends mainly on the vehicle's wheelbase, static margin, and the gear and lever ratios in the steering system, which are fixed quantities. The optimum value of K1 will vary slightly for different vehicle speeds, different tires, and changing load distribution in a vehicle, but the invention will operate effectively on a particular vehicle with a predetermined fixed value of K1.

The preset gain K2 is to be adjusted so that the active stabilizing torque applied by the motor 17 is equal to at least one-quarter of but not more than all of the natural restoring torque which is transiently missing after a rapid steering wheel angle change, as shown in FIG. 3b. The numerical value of K2 depends on the gear and lever ratios in the steering system, including the caster offset of the steered wheels 8, which is the distance from the kingpin axis 9 to the tire-road contact patch 19, as illustrated in FIG. 1. In addition, the numerical value of K2 varies proportionally to the total vehicle mass but changes in the number of passengers, for example, do not normally affect vehicle mass enough to require readjustment of K2 from its preset value.

Values of K2 outside the preferred range will also be beneficial, but the effectiveness of the invention decreases if K2 is too low, and spurious vibrations in the steering system can result if K2 is too high. If K2 is set so the apparatus replaces all of the natural restoring torque which is missing during transient steering motions, then the steering system will behave as a simple harmonic oscillator. The resulting rapid steering system oscillation is quite distinct from the vehicle weave mode. Steering system damping alleviates this vibration, and the preferred source of damping is the reduction of the active stabilizing torque signal TS by subtraction of a signal proportional to steering angular rate at 116. Therefore, as K2 increases toward the upper end of the suggested range for maximum effectiveness in eliminating the weave mode, K3 must be increased as well. As K2 and K3 increase, the steered wheels will return to the straight-ahead position more slowly upon release of the steering wheel. Also, the ease with which the driver of the vehicle can maneuver by rapidly rotating the steering wheel 1 is reduced. Further, more energy and a larger motor 17 are required as K2 and K3 increase. These facts impose an upper bound on the gains K2 and K3.

The best values of the gains K1–K3 for a particular model of motor vehicle can be set with the aid of a test facility, the vehicle, and a trained test driver using instrumentation to monitor the various signals in the system. First, the gain K1 must be adjusted with the vehicle following a circular turn at full highway speed, as explained above. Then, the driver should become familiar with the vehicle's weave mode with the stabilizing apparatus inoperative, by making steering maneuvers at a frequency of 1 Hz, for example. The value of K2 must then be increased from the lower end of the preferred range until the weave mode is substantially eliminated. K3 should be adjusted to provide damping in accordance with the standard theory of simple harmonic oscillators, with a fine adjustment to suit drivers.

Some passive mechanical damping is always present in a vehicle's steering mechanism, so the active damping required will depend on the particular model of vehicle. The mechanical characteristics of steering system components including inertia, friction, and backlash vary greatly among vehicles, so some vehicles have the potential for vibration of various parts. Therefore in addition to the active damping, low-pass filtering (not shown) should be used as needed throughout the electrical circuitry in accordance with good engineering practice to prevent excitation of unwanted vibrations.

The size of the motor 17 and the ratio between gears 18 and 3 should be chosen so that when there is no motor current, the driver does not feel an unusual level of resistance in the steering system due to the motor and gears. Selection of a relatively small motor to reduce inertia and friction is permissible because only transient actuation of the motor is required in the embodiment without power-assist.

FRONT-WHEEL-STEERING VEHICLE WITH POWER ASSISTED STEERING

Description

Figure 4:
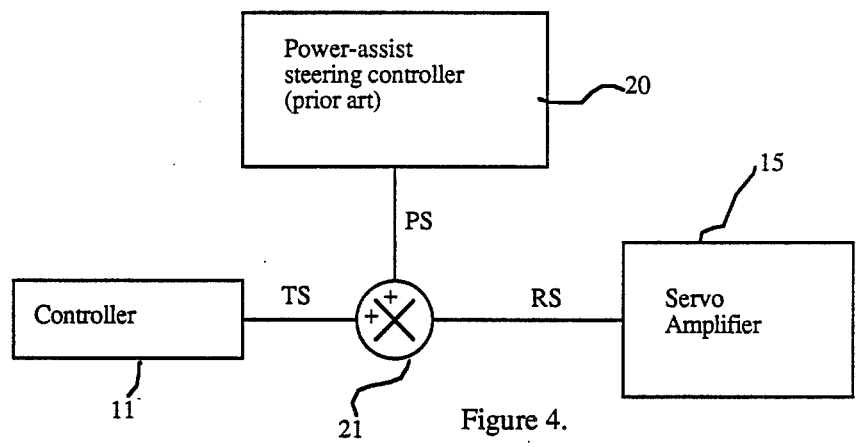
FIG. 4 is a schematic block diagram of an additional controller element necessary to the embodiment with power-assisted front-wheel-steering.

Another preferred embodiment of the invention which is to be used in vehicles which are normally equipped with power-assisted steering is described below with reference to FIG. 4. This embodiment is similar to the one explained above, except that there are additional parts including a controller for power-assisted steering, which is found in the prior art. In FIG. 4, a power assisted steering controller 20 and the steering stabilizing controller 11 are connected to a signal adding means 21. The adding means 21 is, for example, an adder within a microcomputer which also performs all functions of controllers 11 and 20. The adder 21 sums the stabilizing torque signal TS from the controller 11 with the power steering torque signal PS from the power-assist steering controller 20. The resulting signal RS is sent along signal wires from the adder 21 to the servo amplifier 15 described previously. The power steering controller 20 amplifies the torque applied to the steering wheel 1 by the driver of the vehicle so that the signal PS depends on the driver steering torque. Other necessary components of a power steering system such as a steering wheel torque sensor (not shown) must also be included, as described in the prior art (U.S. Pat. No. 4,621,701).

FRONT-WHEEL-STEERING VEHICLE WITH POWER ASSISTED STEERING

Operation

The operation of this embodiment is essentially the same as in the case of front-wheel-steering without power assist, except that the motor 17 applies both stabilizing steering torque and amplified driver steering torque to the steering system. The actively controlled stabilizing steering torque which is due to the present invention is transient in nature, as described previously. The amplified driver steering torque which is due to the prior art is somewhat more continuous, so that more electrical energy is required by this embodiment. The servo amplifier 15 and the motor 17 must therefore be more powerful.

Selection of a low friction motor is less critical than for the first embodiment because the torque amplification function of a power steering system automatically overcomes resistance from the motor and gears. However, fail-safe operation requires minimal friction and inertia. An electric power steering motor which does not hinder the driver when the motor is turned off has been described in the prior art (U.S. Pat. No. 4,650,019).

If a sudden steering motion is made by the driver of a vehicle with a stabilized power steering system according to this invention, the stabilizing torque signal TS will be opposite in sign to the power-assist torque signal PS. The effect therefore is a transient cancellation of the power-assist which prevents the driver from exciting the weave mode of the vehicle. If instead the driver releases the steering wheel during a steady turn, the power-assist torque signal PS will be zero, and the torque signal RS=TS will stabilize the weave mode exactly as in the case of a vehicle without power-assisted steering. The prior art contains descriptions of power steering apparatuses which provide opposing torques to the driver's steering wheel, but the operation of the present invention has a dynamic nature which has not been described in the prior art. Also, operation of the present invention is by action of the stabilizing torques on the entire steering system and it is not merely a means to affect the feel of the steering system as perceived by the driver.

REAR-WHEEL-STEERING VEHICLE

Description

A third preferred embodiment of the invention, which stabilizes rear-wheel-steering vehicles, is described below with reference to FIG. 5. The case to be considered is that of a lightweight RWS vehicle with a single rear wheel, which does not require power-assisted steering. The apparatus required is similar to that needed in the FWS case so only the differences will be described here.

The steering linkage may be any mechanism which sets the steer angle of the steered wheel in accordance with the total angle of rotation of the driver's steering wheel. A mechanism which accomplishes this has been described in the prior art (U.S. Pat. No. 2,101,057). In this case there is a cable or chain 22 which transfers the driver's steering motions to the rear of the vehicle, as shown in FIG. 5. A sprocket 23 driven by the chain 22 is fixed to the rotatable fork 24 through a shaft 25 confined by bearings within a tube 26 which permit the steered wheel 8 to rotate about its steering axis.

A torque receiving gear 27 is fixed to the steering shaft 25. A dc motor 17 which receives motor current MC as in the first embodiment, has a gear 18 on its output shaft which meshes with the torque receiving gear 27. A steer angle and angular rate sensor 10 on the steering shaft 25 has output signal wires which are connected to a controller 11. The lateral acceleration transducer 13 is positioned at the rear of the vehicle as shown in FIG. 5. Although its exact position is not critical, the optimum placement is such that the longitudinal distance from the transducer 13 to the vehicle c.g. equals the vehicle's yaw moment of inertia divided by its mass, further divided by the distance from the c.g. to the front axle. A lateral acceleration transducer so positioned will send a signal AS proportional to the lateral tire force and the natural torque on the steered rear wheel.

All other parts of this embodiment including the controller 11 and the speed sensor 12 are understood to be the same as in the first described embodiment. It must be pointed out here that a RWS vehicle can have understeering characteristics just as many FWS vehicles do. Hence if lateral acceleration varies more linearly than parabolically with changing vehicle speed, the multiplier 111 is to be eliminated as described previously.

Although the actively controlled transient torques due to the present invention are felt by the driver as well as affecting the stability of the vehicle, the function of stabilizing the vehicle is the more important one in rear-wheel-steering vehicles, which are naturally unstable. For this reason, the motor 17 and the steering sensor 10 are preferred to be at the rear of the vehicle so that the steering is stabilized even in the presence of backlash in the linkage to the driver's steering wheel 1.

Figure 5:
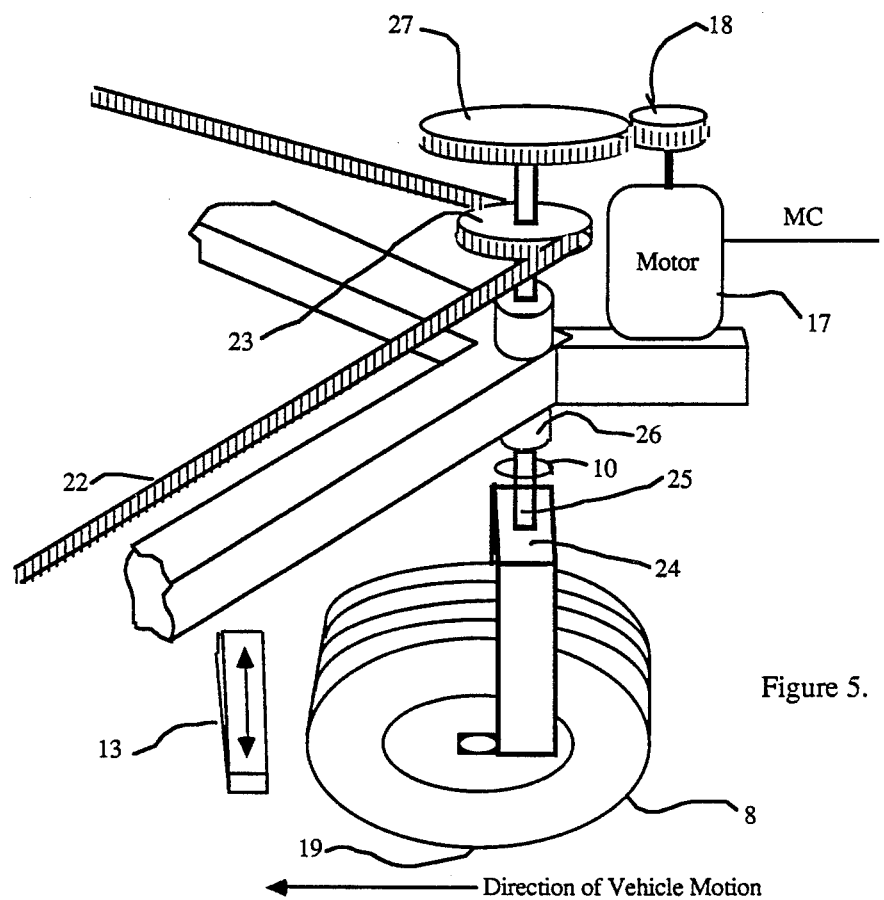
FIG. 5 shows a steered rear wheel on a motor vehicle with a steering stabilizing apparatus according to a third embodiment of the invention.

In the case of rear wheel steering, it is necessary for the centroid of the tire-road contact patch 19 to be forward of the point of intersection of the axis of the steering shaft 25 with the roadway, as indicated in FIG. 5. Thus the caster offset of the steering geometry is in the opposite direction to that required for front-wheel-steering. It is preferred that this negative caster offset distance be somewhat less than the positive caster offset distance normally found on FWS vehicles, so the magnitude of the transient destabilizing torques which must be overcome by the motor 17 are minimized. However, the caster offset distance must be enough to result in an adequate natural restoring steering torque when the vehicle is in a turn.

REAR-WHEEL-STEERING VEHICLE

Operation

Operation of the third embodiment of the invention is described below with reference to FIGS. 5, 6a, and 6b. It is similar in operation to the first embodiment, so only the differences will be pointed out here.

When an RWS vehicle is in a steady turn and the tire-road contact point 19 is forward of the axis of the steering shaft 25, the resulting lever arm for action of the lateral tire force produces a restoring steering torque for returning the steer angle to the straight-ahead steering position. However, the natural transient torques which rise in response to a steer angle change are destabilizing with this steering geometry, so the transient stabilizing torque exerted by the active control system is particularly important.

Figure 6A:
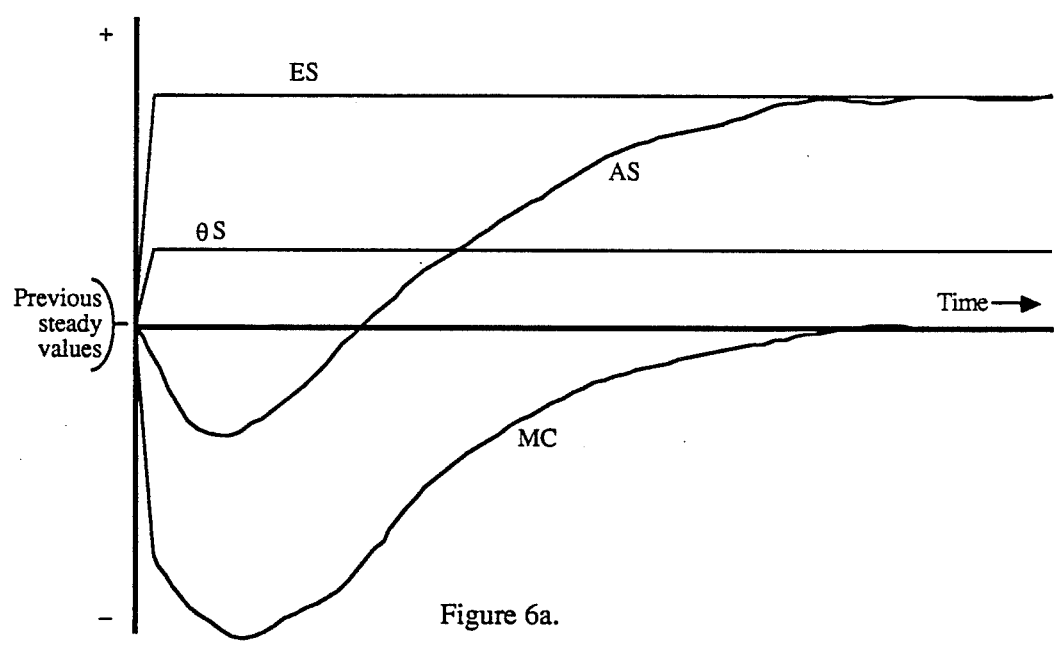
FIGS. 6a and 6b show various graphs of transient response used for explaining the operation of the embodiment of FIG. 5.

In FIG. 6a, it is shown that the signal AS measured by the acceleration transducer 13 is at first in the negative direction in response to a positive change in steer angle, represented by $\theta S$. This is because in order for a RWS vehicle to steer to the left, for example, the rear of the vehicle must first accelerate toward the right. The expected lateral acceleration signal ES, however, is the same as in the FWS case. Again, the motor current MC is proportional to the difference between AS and ES, as determined by the operation of the controller 11 which was described previously.

Figure 6B:
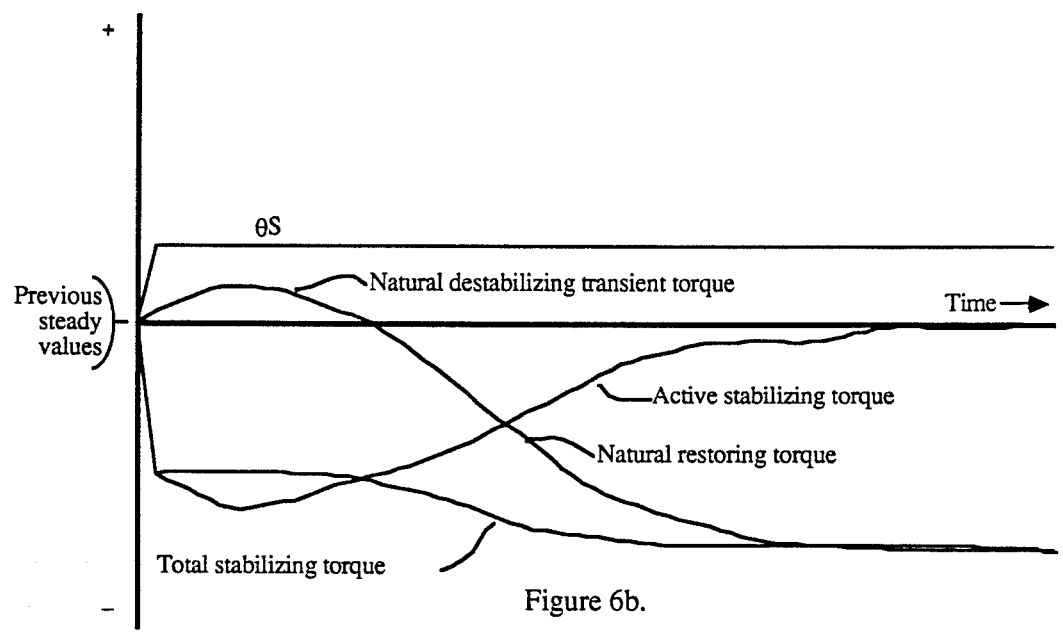

In FIG. 6b, it is shown that there is initially a positive natural steering torque in response to the same positive change in steer angle considered above, which is a destabilizing influence. The reason for this anomaly is that the initial lateral tire force needed to move the rear of the vehicle toward the right in the above example is in the opposite direction to the steady-state tire force toward the center of the turning circle, which is to the left. However, the total steering torque, which is the sum of the destabilizing natural torque and the actively controlled stabilizing torque contributed by the invention, is shown to be a continuously stabilizing influence, in FIG. 6b.

The gain K1 must be set by the criterion which was specified previously for FWS. As shown in FIG. 6b, the gain K2 should be set so most of the missing natural restoring torque is replaced by the stabilizing apparatus. The optimum value of K2 is greater than that in the FWS case because the active torque in a rear-wheel-steering vehicle must be sufficiently large to cancel destabilizing torques in the opposite direction.

As in the FWS case, the level of mechanical steering damping present will affect the requirement for K3. The best adjustment for gains K1–K3 on a particular model of RWS vehicle can be found using the prototype test procedure described previously. The only difference in the experimental adjustment procedure for an RWS vehicle is that rapid high-speed maneuvers with the stabilization apparatus inoperative should be avoided because the weave mode is unstable and therefore more dangerous than in the FWS case.

From the breadth of the above three preferred embodiments, the reader will see that the steering stabilizing apparatus of the invention can be installed on most motor vehicles and will improve the safety of vehicle travel on the highways. As defined in the claims, the essence of the invention is that the total sum of all natural and actively controlled steering torques results in stable, well-damped steering over a wide vehicle speed range and over all driver input frequencies. The present invention consequently accomplishes considerably more than prior art power steering mechanisms which produce steering torques in a less dynamic fashion.

The suggested electro-mechanical apparatuses in the descriptions should not be construed as limitations on the scope of the invention, but rather as examples of some preferred embodiments.

The motor 17 could alternatively be a frictionless direct drive motor on the steering wheel shaft 2 or the rear-wheel-steering shaft 25, eliminating gears 18 and 3 or gears 18 and 27, respectively. Although the electric motor is preferred because transient rapid torque actuation is commanded by an electric circuit, the steering torque actuator recited in the claims may alternatively be hydraulic, and it could also be a linear force actuator which applies torque to the steered wheels 8 through the tie rods 7, for example.

The controller 11 could be dedicated digital electronic hardware rather than a microprocessor. The vehicle speed sensor 12 could be replaced by using a best estimate of vehicle speed which is available from an anti-skid braking system controller. The invention could be applied to a steering system which does not have a mechanical linkage but otherwise provides for a dependence of a wheel's steer angle on the driver's steering wheel position. Fail-safe measures of varying degrees of sophistication could be added. A vehicle could have both a complete conventional power steering apparatus and a steering stabilizing apparatus using a separate torque actuator. The invention could be used on an all-wheel-steering vehicle. Accordingly, the scope of the invention should be determined not by the embodiments illustrated, but by the appended claims and their legal equivalents.

Many other variations are possible. The lateral acceleration transducer 13, which is used to produce a signal proportional to instantaneous steering system torque due to road-tire forces, could be replaced by an appropriate direct measurement of steering torque. The measurement of lateral acceleration is expected to be simpler and more reliable than a direct steering torque measurement. However, the motor of an embodiment which measures torque would supply some of the extra torque required to steer the wheels at very low speed, since this low-speed steering torque would be measured but not included in the steady state estimate. As a result, such a system could be a stabilized power-assisted steering apparatus using a slight variation of the controller 11 without the power-assist controller 20.

As an alternative to adjusting K1 to obtain zero active torque during steady-state cornering K1 could be set so that the total restoring steering torque during steady-state cornering equals a desired value which is different from the natural restoring torque. If acceptable damping characteristics cannot be obtained over a wide speed range, K3 should be made to vary in proportion to vehicle speed, as is required to maintain a constant damping ratio, in accordance with the theory of simple harmonic oscillators. The proper procedure for setting the gain K2 was previously set forth, and no alternative adjustment is suggested, but K2 could be made to automatically vary from its preset value by small amounts. Automatic changes of K2 would depend on input from vehicle load sensors, because the optimum value of K2 is proportional to vehicle mass, as explained previously.

To further optimize operation over a wide vehicle speed range as in racing, a variation of the controller 11 could take into account a vehicle's particular understeer or oversteer characteristics in estimating the expected steady-state lateral acceleration. This improvement could be implemented by replacing the arithmetic components 111–113 of the controller 11 by a memory unit loaded with calibration curves. Each combination of steer angle and vehicle speed would correspond to a memory address wherein the resulting expected value of steady state lateral acceleration is stored. This memory could be automatically updated to account for tire wear or changes in load distribution in the vehicle, by storing the measured values of lateral acceleration during steady turns.

U.S. Pat. No. 4,773,012 describes an apparatus which calculates instantaneous quantities by solving predetermined equations of motion of a vehicle. A microprocessor running a similar real-time dynamic simulation of the vehicle's motion could be used to replace measurement of lateral acceleration or steering torque. However, such a system would be vulnerable to changes in roadway surface characteristics, and it would not have the unique advantages listed below.

In addition to its primary purpose, the steering stabilizing apparatus according to the present invention provides a number of unique advantages. For example, the system will stabilize a FWS vehicle which is moving in reverse. While a vehicle with the invention is driving straight along a hillside, the measured lateral acceleration due to gravity results in the application of a torque which reduces the vehicle's tendency to steer down the hill. In a banked turn, the natural restoring steering torque is reduced, but the lateral acceleration measured is correspondingly lower resulting in automatic replacement of the missing natural torque. If the vehicle is sliding on ice, the stabilizing apparatus will reduce any tendency on the part of the driver to input an overly large steer angle. Therefore when the tires regain traction, the steered wheels will be more or less straight, allowing the driver to easily recover control of the vehicle.

I claim:

1. A method for suppressing the weave mode of a wheeled vehicle which is steerable by a steering system, said weave mode being a natural oscillation of the steer angle and the lateral position of said vehicle at a frequency of approximately 2 Hz or lower, comprising:
   a. measuring instantaneous natural steering torque, said natural steering torque being applied by forces exerted on the wheels of said vehicle by a road or other supporting surface;
   b. measuring steer angle and speed of said vehicle;
   c. automatically calculating a desired steady-state steering torque from measurements of steer angle and vehicle speed, according to a preset algorithm;
   d. automatically subtracting said desired steady-state steering torque from said instantaneous natural steering torque to determine a torque difference;
   e. applying a control steering torque to said steering system according to said torque difference in a manner increasing with increases in said torque difference, said control steering torque being applied in a direction which opposes a rapid steer angle change by an operator of said vehicle and suppresses said weave mode of said vehicle.

2. The method of claim 1, wherein said vehicle is steered primarily by at least one rear wheel, and said weave mode is unstable.

3. The method of claim 1, wherein said preset algorithm for calculating desired steady-state steering torque calculates the actual value of said natural steering torque during a steady-state cornering condition of said vehicle.

4. The method of claim 1, further comprising using power steering assistance by providing supplementing torque to that applied by said operator to said steering system of said vehicle.

5. A steering torque controller for a steering system of a wheeled vehicle, for suppressing the weave mode of said vehicle, said weave mode being a natural oscillation of the steer angle and the lateral position of said vehicle at a frequency of approximately 2 Hz or lower, comprising:
   a. means for automatically determining instantaneous natural steering torque, said natural steering torque being applied by forces exerted on the wheels of said vehicle by a road or other supporting surface;
   b. means for calculating or approximately a desired steady-state restoring torque which is responsive to the instantaneous values of steer angle and speed of said vehicle;
   c. means for comparing said instantaneous natural steering torque with said desired steady-state restoring steering torque to determine a torque difference;
   d. means for applying a control steering torque to said steering system according to said torque difference in a manner increasing with increases in said torque difference, said control steering torque being applied in a direction which opposes a rapid steer angle change by an operator of said vehicle and suppresses said weave mode of said vehicle.

6. The steering torque controller of claim 5 wherein said vehicle is steered primarily by at least one rear wheel, and said weave mode is unstable.

7. The steering torque controller of claim 5, wherein said desired steady-state restoring steering torque equals the expected value of said natural steering torque during a steady-state cornering condition resulting from said steer angle and said vehicle speed.

8. The steering torque controller of claim 5, further comprising a power steering means connected to said steering system, said power steering means providing supplementing torque to that applied by said operator to said steering system of said vehicle.

9. A steering torque controller for a steering system of a wheeled vehicle, for suppressing the weave mode of said vehicle, said weave mode being a natural oscillation of the steer angle and the lateral position of said vehicle at a frequency of approximately 2 Hz or lower, comprising:
   a. a vehicle speed sensing means connected to said vehicle for producing a signal representing the speed of said vehicle;
   b. a steer angle sensing means connected to said steering system of said vehicle for producing a signal representing the angular position of said steering system of said vehicle;
   c. a lateral acceleration sensing means connected to said vehicle for producing a signal representing the instantaneous lateral acceleration of said vehicle;
   d. an estimating means for producing a signal representing steady-state lateral acceleration, in response to said speed representing signal and said steer angle representing signal, connected to said vehicle speed sensing means and said steer angle sensing means;
   e. subtracting means for subtracting said steady-state lateral acceleration signal from said instantaneous vehicle lateral acceleration signal connected to said estimating means and said lateral acceleration sensing means;
   f. means for producing a torque actuating signal in response to the output of said subtracting means, connected to said subtracting means;
   g. means for applying a control torque to said steering system according to said torque actuating signal, said control torque being applied in a direction which opposes a rapid steer angle change by an operator of said vehicle and suppresses said weave mode of said vehicle, whereby the high speed lateral stability of said vehicle is substantially improved.

10. The steering torque controller of claim 9, wherein said vehicle is steered primarily by at least one rear wheel, and said weave mode is unstable.

11. The steering torque controller of claim 9, wherein said estimating means, said subtracting means, and said torque actuating signal producing means are formed in a digital electronic processor.

12. The steering torque controller of claim 11, wherein said estimating means comprises:
   a. squaring means connected to said vehicle speed sensing means for squaring said vehicle speed signal;
   b. first multiplier means connected to said squaring means and said steer angle sensing means for multiplying a squared vehicle speed signal by said steer angle signal;
   c. second multiplier means connected to said first multiplier means for multiplying an output signal from said first multiplier means by a predetermined constant to produce said signal representing steady-state lateral acceleration.

13. The steering torque controller of claim 9, wherein said signal representing steady-state lateral acceleration represents the actual lateral acceleration of said vehicle during a steady-state cornering condition of said vehicle.

14. The steering torque controller of claim 9, further comprising a power steering means connected to said steering system, said power steering means providing supplementing torque to that applied to said steering system by said operator of said vehicle.

* * * * *